United States Patent [19]

Abe et al.

[11] 4,448,342
[45] May 15, 1984

[54] METHOD AND DEVICE FOR TRACER CORRECTION IN A WELDING ROBOT

[75] Inventors: Riichi Abe, Hiratsuka; Katsuji Tsuruta; Seiji Tsujikado, both of Isehara, all of Japan

[73] Assignee: Kabushiki Kaisha Komatsu Seisakusho, Tokyo, Japan

[21] Appl. No.: 318,952

[22] Filed: Nov. 6, 1981

[30] Foreign Application Priority Data

Nov. 17, 1980 [JP] Japan ................................ 55-161781

[51] Int. Cl.³ .............................................. B23K 37/02
[52] U.S. Cl. ................................ 228/102; 219/124.34; 219/125.1; 228/45; 318/568; 364/477; 364/513
[58] Field of Search ................ 228/45, 225, 226, 102; 219/124.34, 125.1, 125.11, 124.22; 364/513, 477; 318/568; 414/730, 735, 4, 5

[56] References Cited

U.S. PATENT DOCUMENTS

| | | | |
|---|---|---|---|
| 3,889,238 | 6/1975 | Sakurai | 414/730 X |
| 3,943,343 | 3/1973 | Irie | 414/730 X |
| 3,951,271 | 4/1976 | Mette | 414/730 X |
| 4,042,161 | 8/1977 | Ando | 228/102 |
| 4,140,953 | 2/1979 | Dunne | 318/568 |
| 4,280,137 | 7/1981 | Ashida et al. | 219/124.34 X |
| 4,347,578 | 8/1982 | Inaba | 318/568 X |
| 4,356,554 | 10/1982 | Susnjara et al. | 414/730 X |

Primary Examiner—Nicholas P. Godici
Assistant Examiner—Charles L. Willis
Attorney, Agent, or Firm—Spensley, Horn, Jubas & Lubitz

[57] ABSTRACT

A method for performing multi-layer welding using a welding robot is disclosed, in which welding on the second and subsequent layers is carried out by backwardly displacing the position of a torch tip by the amount of a preset value. This displacement is made possible through making a constant determined by a torch shape increase by the preset value.

16 Claims, 10 Drawing Figures

METHOD AND DEVICE FOR TRACER CORRECTION IN A WELDING ROBOT

BACKGROUND OF THE INVENTION

This invention relates to a method and device for tracer correction in a welding robot.

When welding large structures by a welding robot of the simple play-back system in which the robot merely repeats the line of actions as taught and welding is performed at a low tacking accuracy, it is frequently the case that there is around 5 to 10 mm error between the taught weld line and the weld line of the next work, hence it is difficult to make satisfactory welding.

To compensate for this drawback, it is practiced to cause the robot to follow in on-line tracing the actual weld line by detecting torch tip error against a weld line through the monitoring of welding current or by detecting the torch tip error against the weld line through the detection of arc produced by welding by means of a TV camera installed to the welding torch.

The coordinate system for detecting the error differs according to the type of error detector (hereinafter referred to as a sensor) being employed. For example, as shown in FIG. 1(a), a sensor for monitoring welding current detects the error in the A—A' and B—B' directions which are respectively parallel and orthogonal with respect to a torch 3, while a sensor employing a TV camera detects the torch tip error in the C—C' and D—D' directions which are inclined by 45 degrees with respect to the torch 3 as shown in FIG. 2, thus the coordinate systems for detecting the torch tip error differ one from the other. The coordinate system of FIG. 1 and that of FIG. 2 are hereafter referred to as the U coordinate system and the V coordinate system for the purpose of explanation. In prior art, it has been common to make the robot control axis correspond to the detection coordinate system of a sensor being used to cope with the difference in the detection coordinate systems for each type of the sensor.

However, with robots having such control axis, weldable works are unaviodably limited, and welding narrow parts such as the inside of a box is difficult. A device has been proposed to enable welding of narrow parts in which an arm rotatable in the horizontal and vertical planes as shown in FIG. 3(a) and (b) is provided between a robot body 5 and the torch 3.

It should be noted here that the detection coordinate system of the sensor installed to the welding torch is based on the torch while the torch posture is based on the coordinate system of the robot control axis. As a result, the two coordinate systems differ from each other. Particularly when a robot performs welding while changing the posture of a wrist 4 as shown in FIG. 4, a correcting operation, that is, converting the torch tip error detected by the senser into the robot displacement has become necessary.

In addition, when groove forms vary as shown in FIG. 5(a) through FIG. 5(d), welding conditions such as torch movement vary accordingly, and in many cases a sensor that can be used varies. In such cases, it is preferable to select and install to the torch 3 a sensor optimum to individual weldment. Prior art robot controllers have failed to make the above correcting operation in response to each type of sensor.

SUMMARY OF THE INVENTION

Accordingly, this invention is directed to solve the above problems.

An object of this invention is to provide a tracer correction device for welding robots, in which specified coefficient values are sequentially read out from a memory storing coefficient values corresponding to the coordinate system of the sensor used according to the current posture of the arm, the coefficient value thus read out is multiplied by the torch tip error detected by the sensor, the resultant value is converted to the displacement values of basic three axes, X,Y, and Z of the robot, and the converted values (hereinafter referred to as correction values) are applied to a robot controller for correcting the displacement values of the above three axes, this invention will be described in detail based on an embodiment of the invention with reference to attached drawings.

DETAILED DESCRIPTION OF THE INVENTION

Figure 3A:
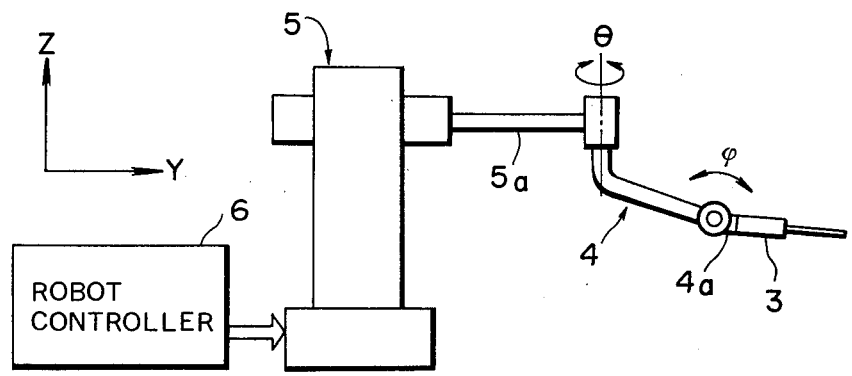
FIG. 3(a), and FIG. 3(b) are illustrations showing the wrist used in the welding robot.
Figure 3B:
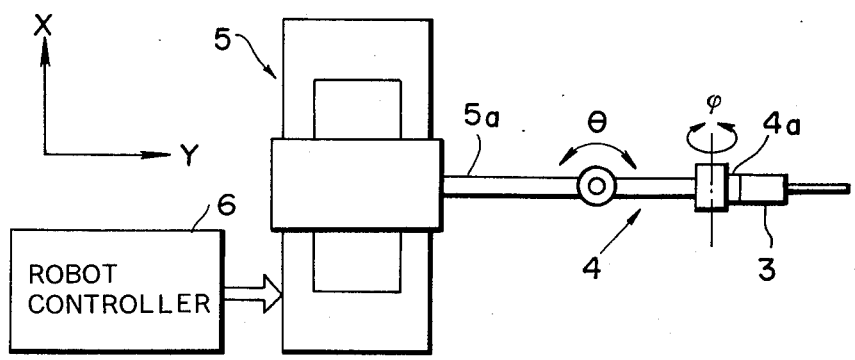
Figure 4:
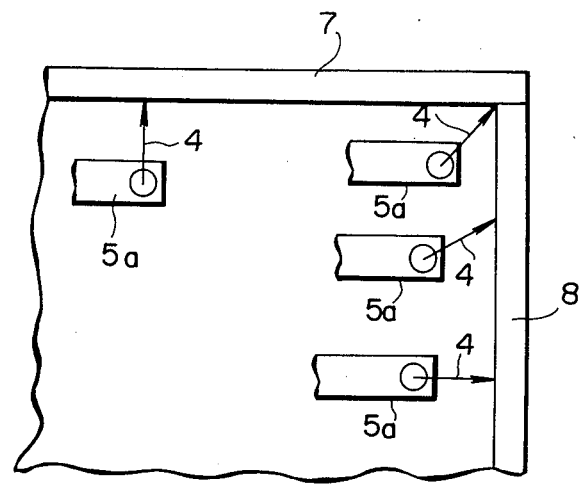
FIG. 4 is an illustration of arm movement during the tracer control.
Figure 5A:
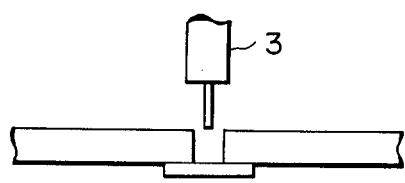
FIG. 5(a) through FIG. 5(d) are drawings showing various groove forms.
Figure 5B:
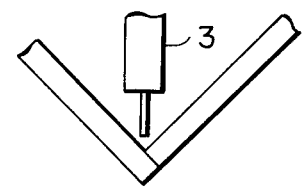
Figure 5C:
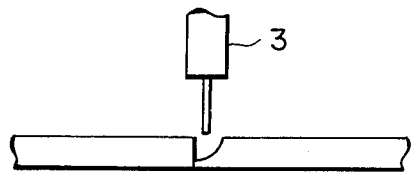
Figure 5D:
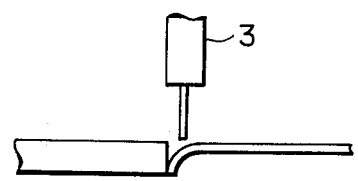

Referring to FIG. 3(a) and FIG. 3(b), a robot associated with a correction device according to this invention is one that includes a wrist 4 having a certain degree of freedom. An arm 5a of a robot body 5 is controlled so as to move in the axial directions X, Y, and Z, and at the front end of the arm 5a, the wrist 4 is installed. This wrist 4 is controlled so as to rotate by predetermined angles $\theta$ and $\phi$ within the horizontal and vertical planes respectively, to the front end 4a of the wrist 4 being installed a welding torch 3. Accordingly the movements of the torch 3 consist of movements in the direction of X, Y, and Z axes (basic three axes of the robot) and rotations $\theta$ and $\phi$ of the wrist 4 on the horizontal and vertical planes. A robot controller 6 is for controlling movement in X-, Y- and Z-axis directions of the arm 5a of the robot body 5 and controlling rotation of the wrist 4 on the horizontal and vertical planes. The robot controller 6 memorizes a plural number of teaching points, i.e., posture data Dx, Dy, and Dz of the arm 5a and posture data D$\theta$ and D$\phi$ of the wrist 4, through teaching, and sequentially outputs control signals ex, ey, ex, e$\theta$, and e$\phi$ (FIG. 6) for controlling axial movements of of the robot and rotation angle $\theta$ and $\phi$ of the wrist 4 based on the posture data Dx, Dy, Dz, D$\theta$, and D$\phi$ corresponding to the teaching points during tracer control, i.e., during actual welding. The arm 5a is controlled in the X-, Y- and Z-axis directions according to control signals ex, ey, and ez, while the wrist 4 is controlled for proper rotation according to control signals e$\theta$ and e$\phi$.

Figure 1:
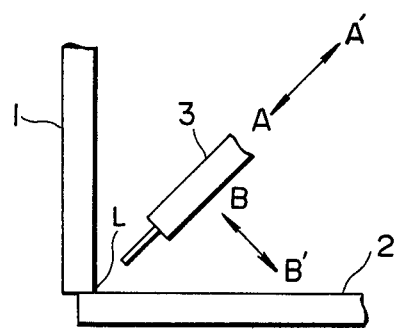
FIGS. 1 and 2 are explanatory illustration of welding torch movements.
Figure 6:
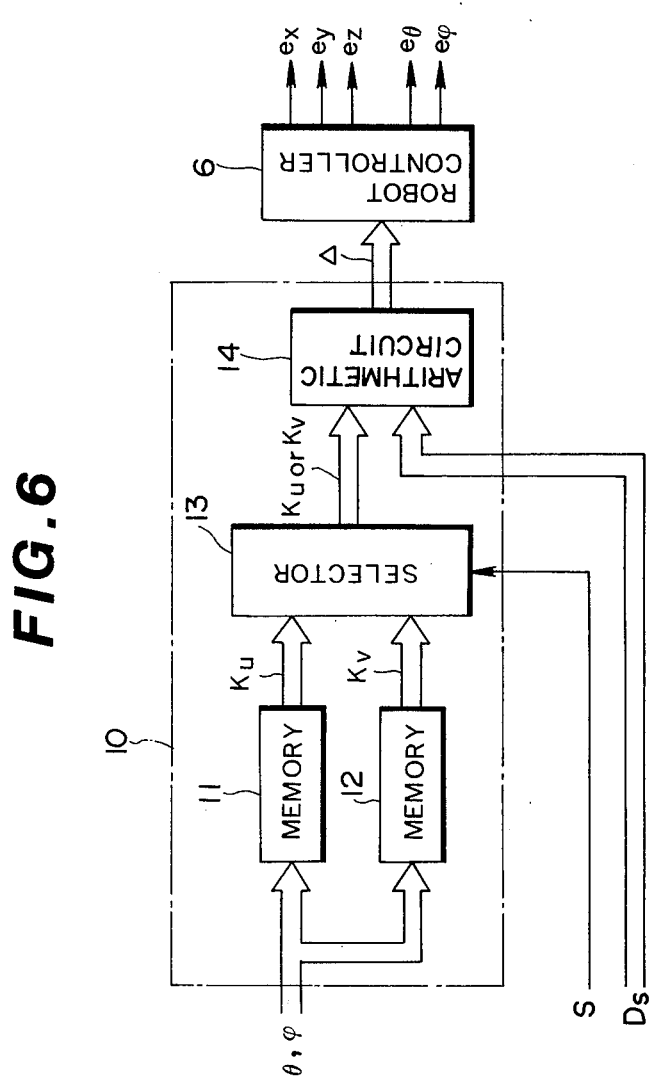
FIG. 6 is a block diagram of an embodiment of tracer correction device according to this invention.

Referring to FIG. 6, a correction device according to this invention is connected to the robot controller 6, and generates signals corresponding to the current posture of the wrist 4, signal S indicating the type of sensor used, and correction signals Δx, Δy and Δz corresponding to control signals ex, ey and ex from the robot controller 6 outputted based on signal Ds corresponding to the torch tip error against a weld line L as detected by a sensor. FIG. 6 shows the arrangement which can deal with two types of sensors. A tracer correction device 10 comprises memories 11 and 12 for storing correction coefficient values for individual coordinate system, a selector 13 for selecting coefficient values corresponding to the sensor used out of the coefficient values read out from memories 11 and 12 and outputting the selected values, and a arithmetic circuit 14 for converting the coefficient values thus selected to the basic three axial displacements of the robot body 5 by multiplying these values by the value of the torch tip error sent from the sensor. The memory 11 stores, for example, correction coefficient values Ku (Kux, Kuy, Kuz) for converting the value of the torch tip error as detected by the above mentioned U coordinate system (FIG. 1(a)) into a value corresponding to each of X, Y, and Z axes of the robot. These coefficient values are sequentially stored for every predetermined rotation angle, for example, for every degree while taking posture $\theta$ and $\phi$ of the wrist 4 as parameters. In tracer control, in response to the current posture of the wrist 4 $\theta$ and $\phi$ these memories 11 and 12 sequentially output Ku (Kux, Kuy, Kuz) and Kv (Kvx, Kvy, Kvz).

In addition, the robot controller 6 outputs control signal ex, ey, ez e$\theta$ and e$\phi$ corresponding to data Dx, Dy, Dz, D$\theta$ and D$\phi$ memorized in the teaching stage during the tracer control, drives the arm 5a and the wrist 4 of the robot body 5, and controls the torch 3. The sensor outputs signal S indicating the type of sensor and signal Ds corresponding to the value of torch tip error against the weld line L, and applies the signal S to the selector 13, the signal Ds to the arithmetic circuit 14. To the memories 11 and 12 are sequentially applied signals corresponding to the current posture $\theta$ and $\phi$ of the wrist 4 and the corresponding coefficients Ku (Kux, Kuy, Kuz) and Kv (Kvx, Kvy, Kvz) are sequentially outputted and applied to the selector 13. The selector 13 selects either of the coefficient values Ku and Kv, and applies the coefficient value thus selected to the arithmetic circuit 14. The arithmetic circuit 14 outputs the correction value Δ (Δx, Δy, Δz) on the basis of the selected coefficient value and current error value Ds of the torch 3 from the weld line. The correction value Δ(Δx, Δy, Δz) is a correction value resulted from the conversion of Ds of the torch 3 into the displacement of the robot body 5 in X-, Y- and Z-axis directions. This correction value Δ(Δx, Δy, Δz) is applied to the robot controller 6. The robot controller corrects control signals ex, ey, and ez according to the correction value C, outputting the signals thus corrected as signals ex', ey' and ez'. Then, the robot controlled 6 controls the posture of arm 5a based on these corrected control signals ex', ex', and ex', and also controls the posture of the torch 3.

Figure 2:
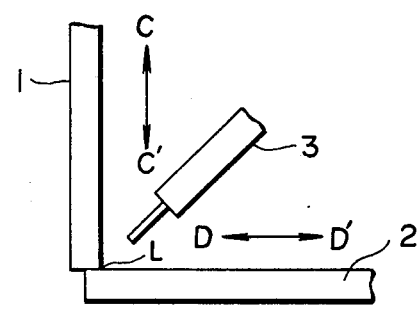

To make the above description clearer and more concrete, description will be made on the operations of the memory 12 and the arithmetic circuit 14 in the case that sensor associated with the V coordinate system is employed. The V coordinate system, as described above, is a coordinate system which is fixed to the torch 3 and in this system, detection of the torch tip error is made in the directions inclined by 45 degrees with respect to the torch 3, that is, directions C—C' and D—D' in FIG. 2. If c and d represent components of the detected values in C—C' and D—D' directions, and Δx, Δy and Δz represent X-, Y- and Z-axis components of the correction value Δ, then $$\Delta x = c \sin (45° - \phi) \sin \theta + d \cos (45° - \phi) \cos \theta \quad (1)$$

$$\Delta y = c \sin (45° - \phi) \sin \theta + d \cos (45° - \phi) \sin \theta \quad (2)$$

$$\Delta z = c \cos (45° - \phi) + d \sin (45° - \phi) \quad (3)$$

In the memory 12, which corresponds to the V coordinate system, there are being stored sets of six values; these values are obtained, for each $\phi$ and $\theta$, from sin $(45° - \phi) \sin \theta$ and cos $(45° - \phi) \cos \theta$ for the coefficient KVx, from sin $(45° - \phi) \sin \theta$ and cos $(45° - \phi) \sin \theta$ for the coefficient KVy, and from cos $(45° - \phi)$ and sin $(45° - \phi)$ for the coefficient KVz. In response to input signals corresponding to $\phi$ and $\theta$ as address signals, the memory 12 outputs the above six values corresponding to $\phi$ and $\theta$. The signal Ds includes the value c and d detected in the directions of C—C' and D—D' in FIG. 2. The arithmetic circuit 14 performs arithmetic operation on Equations (1) through (3) to output the correction values Δx, Δy, and Δz in response to the input of c, d and the above six values.

In this way, the basic three axes of the robot body 5 are corrected according to the current posture of the wrist 4 and the type of the sensor, and the torch 3 is controlled so as to follow the weld line L.

Memories 11 and 12 need not necessarily be provided according to the type of the sensor. For example, an arrangement may be made in which a single memory data is provided to store coefficient values corresponding to the sensor used with the memory content being rewritten each time the sensor type is changed.

As described above, according to this invention, the tracer control to cause the torch to precisely follow the weld time becomes possible by applying correction value resulted from the conversion of the value of the torch tip error into the basic three axes displacement of the robot body based on the inputs of the current posture of the wrist, the coordinate systems of the sensor detection, and the value of the torch tip error.

What is claimed is:

1. A tracer correction device for a welding robot comprising:
    a sensor in which a detection is carried out in a predetermined direction, for detecting torch tip error against weld line with respect to a coordinate system fixed to the torch,
    a memory for storing sets of coefficient values for converting said torch tip error into a correction value with respect to axes in which a robot body is driven, using a signal representative of the torch posture as an address signal for accessing a corresponding one of said sets from said memory, and
    an arithmetic circuit for calculating the correction value with respect to axes in which the robot body is driven on the basis of the coefficient read out from the memory corresponding to the torch posture and the error value detected by the sensor.

2. A tracer correction device for a welding robot according to claim 1, wherein said sensor detects the torch tip error in the directions both parallel and orthogonal to the torch.

3. A tracer correction device for a welding robot according to claim 1, wherein said sensor detects the torch tip error in the directions inclined by a predetermined angle with respect to the torch.

4. A tracer correction device for a welding robot according to claim 1, wherein said memory stores the coefficient value corresponding to the coordinate system in which the robot body is driven.

5. A tracer correction device for a welding robot according to claim 1, wherein said memory stores different sets of coefficient values for respective different types of sensors, and wherein utilization of a particular set of such coefficient values is chosen in accordance with the type of sensor being used.

6. A tracer correction device for a welding robot according to claim 1, wherein said memory is a random access memory, in which a predetermined value is written corresponding to the sensor being used.

7. A tracer correction device for a welding robot according to claim 1, wherein said axes in which the robot body is driven comprises three mutually orthogonal axes and said arithmetic circuit calculates respective correction values corresponding to said mutually arthogonal axes.

8. A tracer correction device for a welding robot including a wrist provided between a robot body and a torch with a degree of freedom in movement, and a sensor for detecting a torch tip error against weld line with respect to a predetermined coordinate system fixed to the torch, comprising:
a memory for storing sets of coefficient values for converting the torch tip error into a correction value with respect to axes in which a robot body is driven by using a signal representative of the wrist posture, and
an arithmetic circuit for calculating said correction value on the basis of (a) the coefficient read out from the memory and corresponding to said wrist posture as represented by said signal, and (b) the torch tip error detected by the sensor.

9. A tracer correction device for a welding robot according to claim 8, wherein said wrist includes two pivoting portions which pivot in mutually orthogonal directions.

10. A tracer correction device for a welding robot according to claim 8, wherein said signal representative of the wrist posture is a signal representative of the rotational position of the two pivoting portions.

11. A tracer correction method for a welding robot comprising steps of:
detecting, by a sensor having a predetermined direction, the torch tip error against weld line with respect to a coordinate system fixed to a torch,
reading out a coefficient value for converting the torch tip error into a correction value with respect to axes in which a robot body is driven corresponding to a torch posture, from a memory in which a set of such coefficient values are stored at addresses accessed by an address signal representing said torch posture,
performing arithmetic operations by an arithmetic circuit to obtain said correction value based on said coefficient value and a torch tip error value detected by the sensor, and
making correction with respect to said axis, using said correction value.

12. A tracer correction device for a welding robot of a type which comprises a robot body movable along driving axes thereof, a torch on which selected ones of a plurality of sensors each detecting torch tip error from a weld line in a direction inherent to each sensor is provided, and a wrist provided between said robot body and said torch for controlling the posture of said torch with respect to said robot body, the torch tip error detected by said selected one sensor serving to obtain a correction value for correcting the position of the robot body with respect to said driving axes, comprising:
a plurality of memories provided corresponding to said plurality of sensors, each of said memories storing one or more coefficient values for converting said detected torch tip error into said correction value corresponding to said torch tip posture;
means for selecting one memory for among said plurality of memories corresponding to said selected one sensor; and
arithmetic means for calculating said correction value based on said detected torch tip error and the coefficient value read out from said memory selected by said means.

13. A tracer correction device for a welding robot according to claim 12 wherein said driving axes are three mutually orthogonal axes and said arithmetic means calculates respective correction values corresponding to said three mutually orthogonal axes.

14. A tracer correction device for a welding robot according to claim 12 wherein said plurality of sensors are first and second sensors, said first sensor detecting the torch tip error in the directions both parallel with and orthogonal to said torch and said second sensor detecting the torch tip error in the directions both parallel with and orthogonal to said torch and said second sensor detecting the torch tip error in two directions respectively inclined by predetermined angles with respect to said torch.

15. A tracer correction device for a welding robot according to claim 12, wherein said wrist includes two pivoting portions which pivot in mutually orthogonal directions.

16. A tracer correction device for a welding robot according to claim 15, wherein the posture of said torch is decided by the rotational position of said two pivoting portions.

* * * * *